UNITED STATES PATENT OFFICE.

MICHEAL J. FLEMING, OF PORTLAND, OREGON.

HAIR-TONIC.

SPECIFICATION forming part of Letters Patent No. 578,632, dated March 9, 1897.

Application filed May 11, 1896. Serial No. 591,192. (No specimens.)

*To all whom it may concern:*

Be it known that I, MICHEAL J. FLEMING, a citizen of the United States, residing at Portland, Multnomah county, State of Oregon, have invented a new and useful composition of matter and method of making the same to be used for the restoration of hair upon the heads of persons who have become bald, of which the following is a specification.

My said composition is made of the following ingredients, combined in the following manner: Take an earthen vessel entirely free from any metallic substance and fill it with pure water. In such vessel deposit a piece of clean iron several pounds in weight, and allow it to remain in the water for the period of one month, whereby iron oxid is produced and becomes disseminated in the water. Then take one-half pint of the water from said vessel in which the iron has remained for said length of time, and add to it one pint of the best Jamaica rum, and to these two ingredients add one pint of pure melted hot bear's grease. Put these three ingredients combined in an earthen jar and shake it thoroughly while the contents are hot. After thoroughly shaking said jar place it in a vessel of water at boiling heat, and allow it to remain there for about six hours, whereby the mixture will be maintained for that length of time at a degree a little below 212° Fahrenheit. Then remove said jar from said vessel of hot water and let it stand until it gets cool, and then thoroughly shake it again, after which place said jar containing said ingredients in a vessel of cold water and allow it to stand for forty-eight hours, and in one week thereafter its contents are ready for use.

When this compound is used, it is to be applied with the fingers to the scalp where the hair is thin or absent, and to be rubbed in thoroughly for a few minutes. Such application may be repeated two or three times a week.

What I claim, and desire to secure by Letters Patent of the United States, is—

1. The method of producing the composition hereinbefore described, which consists in mixing water containing iron oxid, with rum, and hot bear's grease; then maintaining the mixture for several hours at a heat slightly below 212° Fahrenheit; next, successively shaking and thoroughly cooling the mixture, as specified.

2. The improved remedy for baldness, consisting of water containing iron oxid, rum, and bear's grease, the proportions being one-half of the water to a double quantity of each of the other ingredients, as specified.

MICHEAL J. FLEMING.

Witnesses:
    GEO. H. WILLIAMS,
    ALBERT E. GEBHARDT.